Feb. 21, 1956 G. T. SCHJELDAHL 2,735,797
METHOD OF HEAT SEALING AND SEVERING PLASTIC SHEETS
Filed Dec. 1, 1952
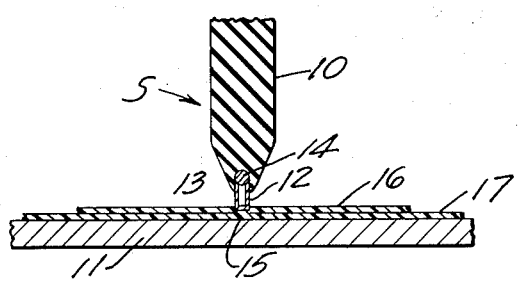
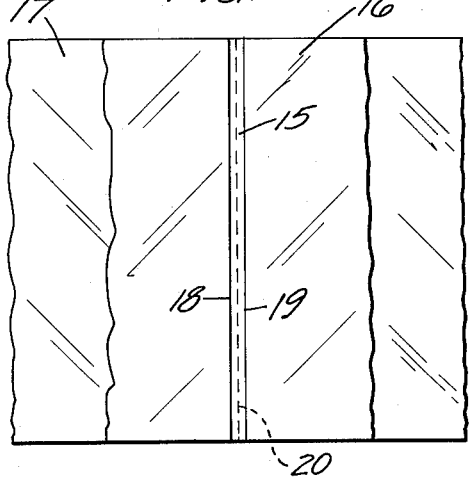
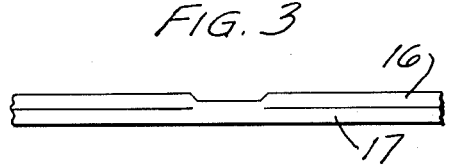
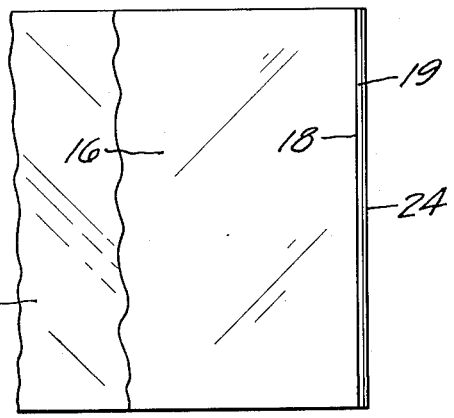
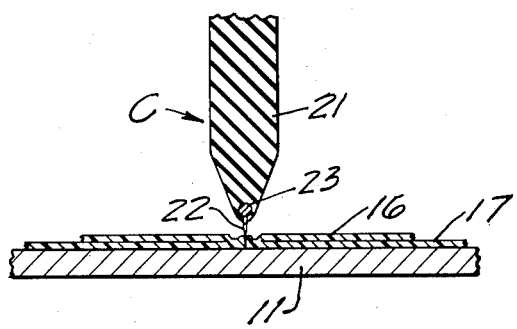
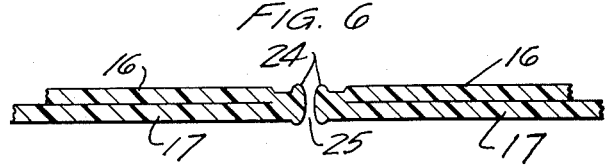
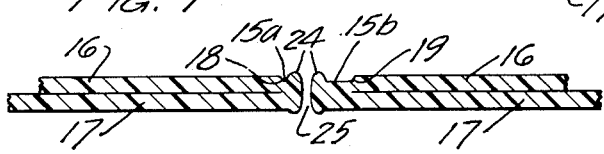
INVENTOR.
GILMORE T. SCHJELDAHL
BY
Williamson, Williamson, Schroeder & Adams
ATTORNEYS United States Patent Office 2,735,797
Patented Feb. 21, 1956

2,735,797

METHOD OF HEAT SEALING AND SEVERING PLASTIC SHEETS

Gilmore T. Schjeldahl, Farmington, Minn., assignor to Herb-Shelly-Inc., Farmington, Minn., a corporation of Minnesota Application December 1, 1952, Serial No. 323,489

5 Claims. (Cl. 154—116)

This invention relates to plastic heat seals and more particularly to a method of heat sealing and severing plastic sheets.

It is an important object of the invention to provide for a method of sealing thermoplastic sheets in a narrow band followed by cutting along the band in a manner so as to preserve a good seal regardless of the true centering of the cut line. In the formation of many plastic articles manufactured from sheet material having thermoplastic qualities, it is often desirable to separate a finished article from another one by cutting along the center of the heat seal which separates the articles. There is then a margin of heat sealed material left attached at the edge of each article which will form a strong bond at the outer edge of each of the articles. Unfortunately, however, because of the difficulty in accurately aligning these pre-formed seal bands with a cutting instrument, it has become the practice to make the width of the seal much greater than necessary. When so doing, of course, it is not essential that the knife or shear arrangement cut the band at the longitudinal and exact center. Using a wide band not only results in a waste of material, but also may throw off the dimensions of an article in which a series of pockets or containers are formed in predetermined spaced relation, the articles being severed periodically at one of the heat sealed bands. Thus, where an article such as a card holder is manufactured from strip stock, the heat seal at intervals such as the sixth or seventh band, must be cut down the exact center to preserve the equivalent areas in each of the pockets or sections. If all the bands are widened, there is a considerable loss of useful area and if only the bands at which each cut line is made are widened, then the adjacent pocket areas must necessarily be less. There is, of course, the alternative of devising a complicated machine which can be pre-set so as to feed a slightly greater amount of material whenever a cut line is encountered and which will, at the same time, provide for heat sealing on a wider band area. Obviously, such a machine would be complicated and costly and it is hence desirable to be able to form all of the heat sealed bands evenly spaced and with exactly the same width, the cut line being so formed as not to weaken the seal at the end cut line. A further objection to a wide heat seal is the wrinkling or distortion which is caused thereby. A distorted area in a sheet plastic article detracts from its appearance and sales appeal.

It is, therefore, another object of the invention to provide for a method of sealing and cutting a plurality of thermoplastic sheets in which the seal is formed first by applying under mild pressure a narrow heated instrument to an outer surface of the associated plastic sheets to form a narrow band seal or bond, then cutting by melting the thermoplastic sheets longitudinally and within the outside edges of the band seal by means of a hot edged instrument so as to leave a strong superimposed reinforcing bead after the cutting or severing.

It is still another object of the invention to make a series of neat and narrow heat seals in accurate predetermined, spaced relation along a strip of stock material containing a plurality of sheets of thermoplastic material, then separating the stock strip at one of said narrow bands without upsetting the dimensions of the areas between sealing bands and, at the same time, preserving the unwarped appearance of the stock and reinforcing the strength of the seal.

These and other objects and advantages of my invention will more fully appear from the following description made in connection with the accompanying drawings wherein like reference characters refer to the same or similar parts throughout the several views and in which:

Fig. 1 is a side elevation of the heat sealing instrument which performs the first step in my method, the thermoplastic sheets and portions of the instrument being shown in vertical section;

Fig. 2 is a top plan view of the heat sealed band across a pair of thermoplastic sheet segments having been formed by the instrument shown in Fig. 1;

Fig. 3 is an enlarged, segmental edge view of the narrow heat sealing band formed as in Fig. 2;

Fig. 4 is a side elevation of the sealed sheets as formed in Fig. 2 being severed by a second instrument, a portion of the illustration being shown in section;

Fig. 5 is a segmental view of the completed reinforcing bead applied to one portion of the sealing band, the band having been severed to form separate articles;

Fig. 6 is an enlarged segmental vertical section of a pair of thermoplastic sheets after having been heat sealed and severed at the center of said heat seal; and Fig. 7 is a similar enlarged segment in vertical section of a pair of thermoplastic sheets having formed therein a heat seal band and having been severed according to my method at a point substantially off center.

Referring now more particularly to the drawing, my invention contemplates the sealing and severing of the plurality of sheets constructed of material such as polyethylene, polyvinyl, Pliofilm and other thermoplastic substances which are suitable for constructing a flexible and strong plastic material. It is also a requisite that the material be fusible with other sheets of the same or similar material.

Fig. 1 is a diagrammatic representation of an instrument S designed to effect heat sealing in a narrow band transversely of a plurality of thermoplastic sheets. The instrument comprises a relatively movable body or plunger 10 and a platen or base 11. Plunger 10 terminates forwardly in a narrow head 12 having a contacting face 13 for pressing engagement with sheets of thermoplastic material. Disposed within the instrument body and in heat transmitting relation with the head 12 is a heating element 14. The heat element 14 is preferably an electrical element controlled by means not shown to deliver a constant temperature to the head 12. The sealing instrument S may be of any length requisite to form a sealing band across the entire width of the plurality of plastic sheets inserted therebeneath. Fig. 1 shows a pair of thermoplastic sheets being compressed and heated at a sealing band 15 so as to fuse the top sheet 16 to the lower sheet 17 as shown. It is understood that the body 10 of the sealing instrument S can advance downwardly toward the platen or base 11, or, conversely, the platen or base 11 may advance upwardly toward the body 10 so as to engage and compress the sheets of material against the face 13 of the head 12. The foregoing is old in the art and there are many types of machines and instruments for accomplishing the sealing of sheet materials in the above described manner. The appearance of the heat seal 15 is as shown in Fig. 2. Sheet 16 is completely fused to sheet 17 at the narrow band 15 with sharply defined side edges existing at 18 and 19.

In order to form separate articles without the necessity of forming a wide sealing band, my invention contemplates cutting the band 15 along the longitudinal central line 20 as shown in Fig. 2 or at any other line intermediate the side edges 18 and 19, each of the severed portions retaining a strong sealed edge regardless of the proper centering of the cut line 20.

The instrument by which the severing and reinforcing is accomplished is shown in Fig. 4 and is designated generally by the letter "C." This second instrument is likewise a heating device and comprises a body 21 operating cooperatively with a platen or base 11 in a manner similar to that of the sealing instrument S. The head of the heating body terminates in a sharp edged tool or a knife edge 22. A heating element 23 conducts heat to the sharp edged tool 22 in a controlled manner so as to exceed the melting temperature of the plastic material. The sealing band 15 of the thermoplastic sheets as shown in Fig. 2 is positioned generally beneath the projected path of the sharp edged tool 22 following which the body of the severing and reinforcing instrument C is brought down upon the sealing band 15. The sharp edge 22 is not pressed upon the sealing band 15 with sufficient force to physically cut the thermoplastic sheets. It is rather the heat from the element 23 which is transmitted down to the sharp edge and melts its way through the sealing band as shown. The body 21 of the reinforcing and sealing instrument is then retracted from the severed articles leaving an edge as shown in Fig. 5. There is thus formed a finished seal in which the outside edge 18 remains and a portion of the sealing band width 15 likewise remains at 19. At the very edge, a bead 24 will cool and solidify, thus serving to reinforce the entire closure.

Referring now to Fig. 6, the formation of the bead 24 at each side of the sever 25 is shown in the case where the line of sever has been disposed centrally along the longitudinal line 20, as shown in Fig. 2. This, of course, is the ideal situation, the strength of each of the closures being equally and well preserved as to both sides of the sever 25. Now, however, if the alignment has not been perfect, which is usually the case, the sharp edged tool 22 will enter the narrow band 15 in a line to one side or the other of the central line 20. As long as this line of sever is within the sides 18 and 19 of the originally formed heat seal band 15, the closure will be good and the heat seal will be effective to maintain the strength of the finished article without altering the internal dimensions originally defined by the edges 18 and 19. When the sharp edged tool 22 has thus been introduced in an off center relation, the same line of sever 25 is produced and the same beads 24 are formed at each side of the line of sever 25. It will be noted, however, that the fused band 15a is of a much narrower width than that of 15b. In either case, however, the bead 24 has served to reinforce the sealing band 15 at the same time as the reinforcing and severing instrument C operated upon the band 15 to sever the articles. It is to be noted that if a knife or shearing instrument had mechanically cut the narrow band at the position indicated in Fig. 7, the line of sever would have been so close to the edge 18 of band 15 that the closure would be extremely weak and would easily rupture when an appreciable stress was applied thereto.

It may thus be seen that I have devised a novel method of forming a double heat seal between sheets of thermoplastic material without the sacrifice of dimensions and without warping or distorting the material, the severed edges of the separated sheets being assured of strength and neatness in spite of the lack of perfect alignment of the cutting instrument.

What I claim is:

1. The method of reinforcing and severing a previously formed narrow transverse heat seal across a plurality of thermoplastic fusible sheets which consists in bringing into contact longitudinally of said heat seal and within its side edges a heated sharp edged tool, melting through the plurality of sheets at said seal to sever the sheets and simultaneously form a molten beaded edge at each edge of the line of sever, and removing the sharp edged tool from the line of sever and allowing said molten beaded edges to cool and solidify.

2. The method of heat sealing and severing a plurality of thermoplastic fusible sheets which consists in first applying heat transversely of the sheets to fuse them together in a narrow band seal, permitting the narrow band seal to cool, applying concentrated heat in a width considerably less than said narrow band seal and longitudinally along the narrow band seal between the outer edges thereof and simultaneously severing through the narrow band seal by means of the applied concentrated heat for said lesser width and superimposing a beaded edge upon the band seal at each side of the line of sever, and permitting the beaded edge to cool.

3. The method of heat sealing and severing a plurality of thermoplastic fusible sheets which consists in bringing the sheets together in surface contact, compressing and fusing the sheets together in a narrow band, permitting the fused sheets to cool in a narrow band seal, applying concentrated heat in substantially a straight line longitudinally of the narrow band seal and within the side edges thereof to thereby sever the sheets and simultaneously form a molten beaded reinforcing edge upon the narrow band seal at each edge of the line of sever, and permitting the beaded edge to cool and solidify.

4. In a plastic product having a plurality of thermoplastic sheets, an edge weld comprising a fused band adjacent the outer edge of said weld, said band having a thickness slightly less than the composite thickness of said plurality of plastic sheets, and a further seal at the extreme outer edge of said weld having a beaded configuration of thickness greater than the first mentioned narrow band seal.

5. The method of forming a severed and reinforced welded edge of sheets of thermoplastic material which consists in first applying heat to the sheets to fuse them together in a narrow completed band seal, then bringing into contact longitudinally of said band seal and within its side edges a heated knife-edge member, melting through the band seal to sever the sheets and simultaneously form a molten beaded reinforced edge at each edge of the line of sever, and removing the knife-edge member from the line of sever and allowing the molten reinforced edge to cool and solidify.

References Cited in the file of this patent

UNITED STATES PATENTS

| | | |
|---|---|---|
| 2,347,439 | Shea et al. | Apr. 25, 1944 |
| 2,430,496 | Dodge | Nov. 11, 1947 |
| 2,444,685 | Waters | July 6, 1948 |
| 2,524,584 | Zehr | Oct. 3, 1950 |
| 2,638,963 | Frederick et al. | May 19, 1953 |
| 2,682,910 | Piazze | July 6, 1954 |